United States Patent [19]
Rusek, Jr.

[11] Patent Number: 5,094,899
[45] Date of Patent: Mar. 10, 1992

[54] HIGH R SUPER INSULATION PANEL

[75] Inventor: Stanley J. Rusek, Jr., Newark, Ohio

[73] Assignee: Owens-Corning Fiberglas Corporation, Toledo, Ohio

[21] Appl. No.: 579,912

[22] Filed: Sep. 6, 1990

[51] Int. Cl.$^5$ .......................... B32B 1/06; B32B 17/04
[52] U.S. Cl. ........................................ 428/69; 428/74; 428/75; 428/76
[58] Field of Search ...................... 428/69, 74, 75, 76; 156/70

[56] References Cited

U.S. PATENT DOCUMENTS

| | | | |
|---|---|---|---|
| 4,359,496 | 11/1982 | Kratel et al. | 428/75 |
| 4,486,482 | 12/1984 | Kobayashi et al. | 428/69 |
| 4,669,632 | 6/1987 | Kawasaki et al. | 428/69 X |
| 4,798,753 | 1/1989 | Abuaf et al. | 428/69 |

*Primary Examiner*—Alexander S. Thomas
*Attorney, Agent, or Firm*—Patrick P. Pacella; Ted C. Gillespie

[57] ABSTRACT

An insulation panel comprises a mineral fiber board having a density between 8 and 28 pounds per square foot, the fibers having no organic binder thereon, and between 5 and 40 percent by weight of particulate material packed in the interstices of the board, and a gas-tight envelope encapsulating the board, the envelope being evacuated to a vacuum between $10^{-4}$ Torr and 10 Torr.

20 Claims, 2 Drawing Sheets

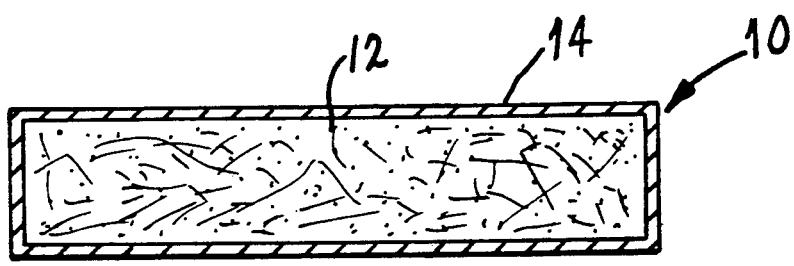
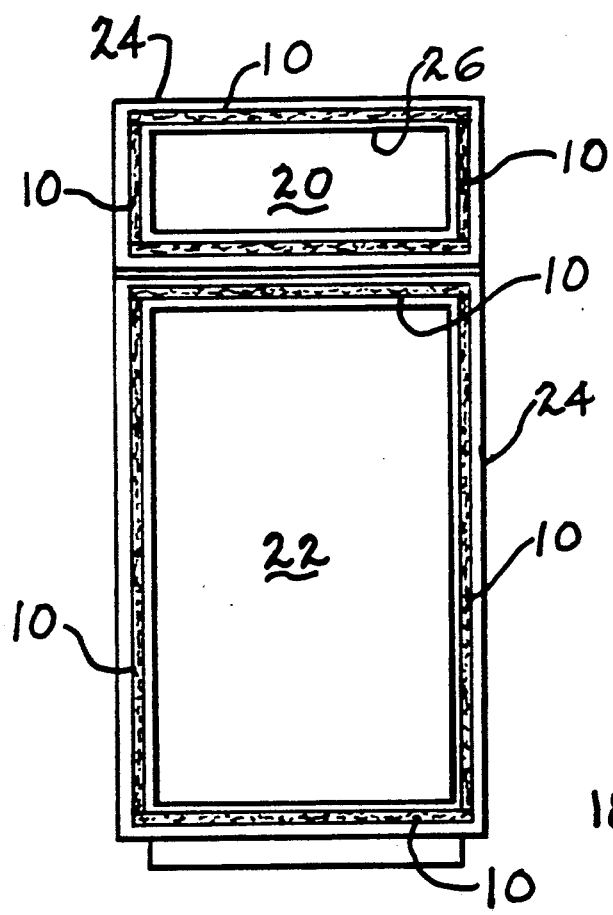
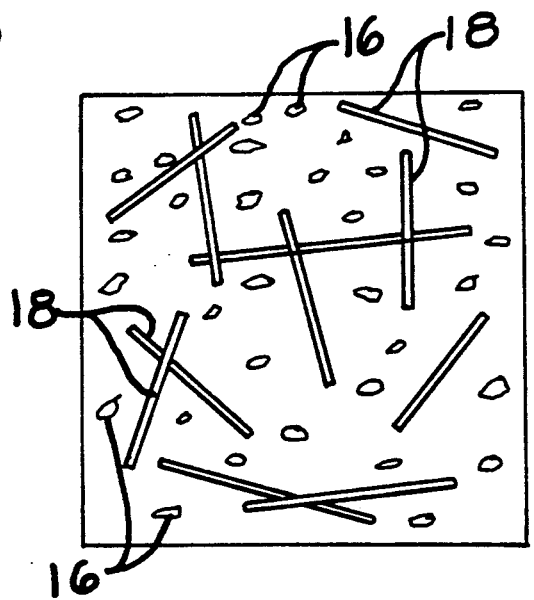

HIGH R SUPER INSULATION PANEL

TECHNICAL FIELD

This invention relates to insulation products suitable for insulating appliances, transportation vehicles and industrial equipment. More particularly, this invention relates to insulation products having a very high resistance to thermal conductivity in order to provide good insulating qualities with a minimum insulation product.

BACKGROUND ART

Traditional insulation materials for appliances, transportation vehicles and industrial equipment include mineral fibers and foamed materials. For the insulation of refrigerators, freezers, or water heaters, mineral fiber insulation can provide an R-value of about four R's per inch, where an R-value equals one $HrFt^2 °F/Btu$. Foamed materials containing chlorinated fluorocarbons in the foam cells can provide an R-value of 8 R's per inch. Due to desires to eliminate the fluorocarbons from the environment, and desires to provide more efficient insulation products to save energy, manufacturers of appliances, transportation equipment and industrial equipment, are seeking more efficient insulation products. One possible solution is to merely increase the thickness of the insulation product, thereby increasing the overall R-value. This is an undesirable solution because it makes the insulated object rather bulky.

In order to provide a very efficient insulation product ("super insulation"), some sophisticated insulation systems have been developed. Some of these systems have been developed for space applications for NASA and other governmental bodies.

One of the known super insulation products is that of finely divided inorganic particulate material compressed into a board-like structure, and encapsulated in order to contain the material. The material resembles a flour-like powder. The predominate material used is silicon dioxide or forms thereof, particularly fumed silica or precipitated silica. Preferably, the material is amorphous in structure rather than crystalline. It is known that these products can be compressed into boards having an R-value of 15 R's per inch at 75° F. mean temperature and a 40° F. temperature driving force when the encapsulation envelope is evacuated. The particulate material does a good job of stopping the gas conduction component of thermal heat transfer but does not do a good job of stopping the radiation component of thermal heat transfer. Also, the greater the vacuum (i.e., the lower the gauge pressure) the more the particulate material is compressed, thereby providing more particle-to-particle contact and a better path for solid conduction heat transfer. Thus, an upper limit to R-value is reached dependent on the substantial solid conduction heat transfer of the compacted particulate material. Further increases of vacuum do not improve the R-value of wholly particulate material insulations because of solid conduction. In addition, non-opacified powders are relatively inefficient in blocking the radiative heat transfer.

Another sophisticated super insulation product involves the use of layers of highly reflective material to stop the radiant component of heat transfer. The reflective layers are typically foils, and these must be separated by thermally efficient spacers, such as thin glass fiber mats, or glass beads. The product must be encapsulated and evacuated to prevent gas conduction heat transfer. The drawback with these foil systems is that the foils are difficult to work with, and the product has high material costs. Further, an inherent problem with any evacuated insulation system is that the system must be able to withstand the atmospheric pressure pressing on the sides of the panel. The greater the vacuum, the greater the pressure produced from outside the panel. The thin layers of foil, even though kept separated by spacers, are subject to deformation by the atmospheric pressure. In the event layers of foil touch each other, a path of solid thermal conduction will result, thereby providing a thermal bridge.

It can be seen that the prior art super insulation products lack many of the desirable features of an ideal product. These features include resistance to compressibility, ease of manufacture, relatively low cost of materials, avoidance of high vacuums, and maintenance of a high R-value during a long life of the product.

DISCLOSURE OF INVENTION

The present invention is directed to an insulation panel comprising a predominant amount of mineral fibers forming a board having a density between 8 and 28 pounds per cubic foot ("pcf"). Packed into the interstices of the board are between 5 percent and 40 percent by weight of particulate material. The mineral fibers at these densities provide a good barrier to radiant energy heat transfer. The particulate material provides a good barrier to heat transfer by gas conduction. The entire structure is sufficiently resistant to compression so as to provide a good structure for the pressures of the atmosphere when the panel is encapsulated and evacuated. The materials are relatively straightforward to work with, and easy to form into the product of the invention. Further, the materials are relatively inexpensive. Finally, the insulation product of the invention should be stable for a long product life of constant R-value.

In a preferred embodiment of the invention the particulate material has a surface area of at least 50 square meters per gram. Most preferably, the particulate material is an amorphous silica powder.

In a specific embodiment of the invention, the panel is enclosed in a gas-tight envelope comprising a metal foil having a thickness between ½ mil and 4 mils. Preferably, the envelope is evacuated to a vacuum between $10^{-4}$ Torr and 10 Torr.

BRIEF DESCRIPTION OF DRAWINGS

FIG. 1 is a schematic cross-sectional view in elevation of an insulation panel of the invention.

FIG. 2 is a schematic blown up view of glass fibers and amorphous silica particles according to the invention.

FIG. 3 is a refrigerator/freezer containing the insulation panels of the invention, and shown in a schematic cross-sectional view in elevation.

BEST MODE FOR CARRYING OUT THE INVENTION

Figure 4:
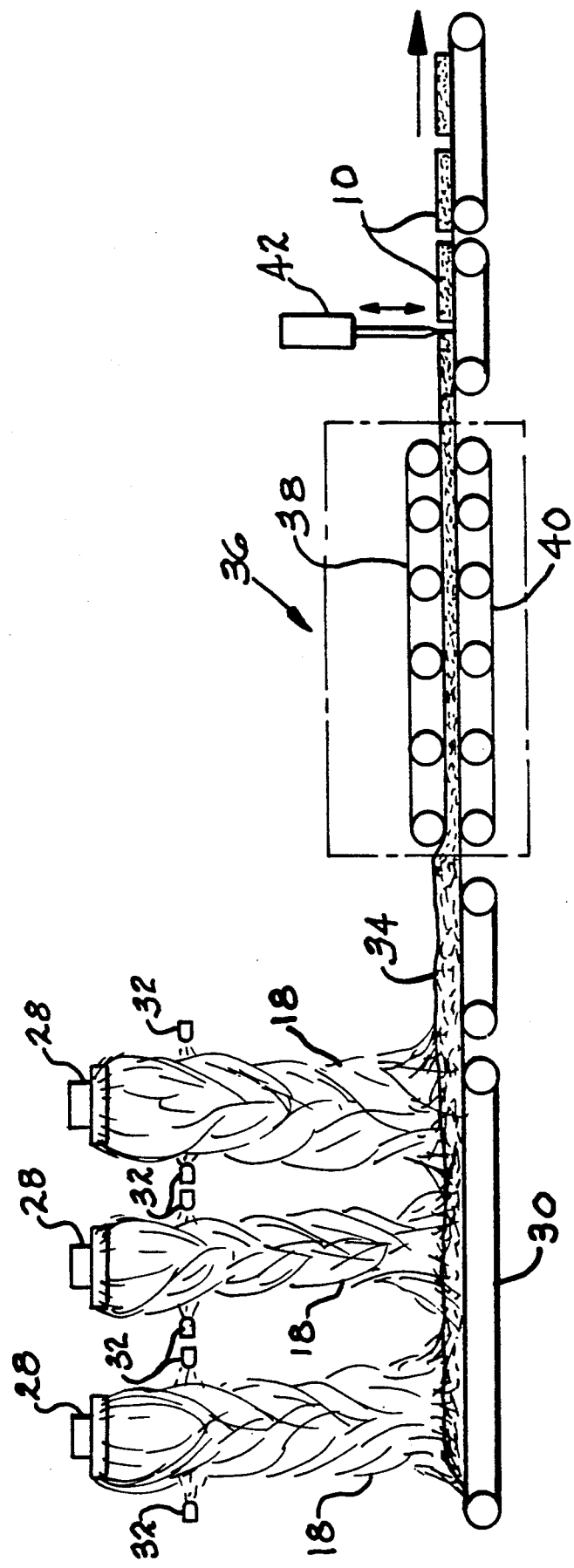
FIG. 4 is a schematic side elevational view of a manufacturing process for making the insulation panels of the invention.

The invention will be described in terms of an insulation panel having glass fibers as the mineral fibers. It is to be understood that other mineral fibers, such as fibers made from rock, slag or basalt, could be employed in the invention.

Referring to FIG. 1, it can be seen that insulation panel 10 is comprised of coreboard 12 and envelope 14. The envelope can be any material suitable for encapsulating or enclosing the coreboard. Preferably, the material has low thermal conductivity, and is impervious to gases in order to maintain a vacuum as desired. Such envelopes are known to those skilled in the art. A typical envelope is made of a thin layer of metal foil. Preferably, the gas-tight metal foil envelope has a thickness between ¼ mil and 4 mils.

If a vacuum is applied within the insulation panel, it is preferred that a gettering material be placed within the envelope in order to scavenge any stray low molecular weight gases present within the envelope. Such gettering materials are well known to those skilled in the art.

The coreboard is predominantly made from glass fibers, preferably fibers having a diameter between 1 and 25 microns, and most preferably having a diameter between 3 and 12 microns. The density of the board, without any particulate material applied, is between 8 and 28 pcf. Preferably the density is between 12 and 20 pcf.

As shown in FIG. 2, amorphous silica particles 16 are packed in the interstices of fibers 18 of the coreboard. The fibers in FIG. 2 are shown schematically, and relatively speaking are shown much shorter than they would be in reality.

The particulate material can be any number of materials suitable for the invention, for example, amorphous silica, fumed silica, fused silica, and graphite. The particulate material has a large surface area-to-weight ratio, at least 50 square meters per gram, preferably at least 150 square meters per gram, and most preferably at least 400 square meters per gram. The preferred test for measuring the surface area per unit weight of the particulate material is the BET test (Brown, Emit & Teller), which is ASTM Specification Technical Bulletin No. 51, 1941, pp. 95.

At the densities at which the glass fiber board would be used for the invention (between 8 and 28 pcf.) a microscopic view of the fibers would show large spaces or voids in the interstices between the fibers. This is shown schematically in FIG. 2. Positioned within these spaces are the silica particles. These particles are packed in the interstices of the board, i.e., the particles are positioned between and on the glass fibers.

It is very desirable that the glass fibers are clean and contain no binder, particularly no organic binder, so that under vacuum conditions there is no gaseous formation of an organic material to form gases for conduction within the vacuum of the envelope. One of the surprising results of the invention is that the silica particles themselves act as a form of binder, holding the glass fibers together in a board-like structure in a way totally unexpected in the art. The silica particles in contact with the glass fibers apparently are acting as a binder agent because the board has greater cohesive strength with the silica particles packed in the interstices than the board has in the absence of the silica particles.

In one embodiment of the invention, some or all of the air from the envelope is removed and replaced with a heavier gas, such as argon, in order to cut down on the heat transfer by gas conduction. Preferably, such a heavy gas has a molecular weight greater than that of gaseous oxygen, and the heavy gas constitutes at least 50 percent of the gas molecules contained in the envelope.

As shown in FIG. 3, the refrigerator/freezer is comprised of freezer compartment 20 and refrigerator compartment 22. The insulation panels are positioned between outer wall 24 and inner wall 26 of both the refrigerator and freezer compartments. The insulation panel of the invention can be molded or formed to fit simple curved patterns.

In addition to use as insulation for refrigerators and freezers, the insulation panel of the invention can be used for insulating water heaters, railroad cars and other transportation vehicles, vessels for containing cryogenic liquids, such as liquid oxygen and liquid nitrogen, space vehicles and household ranges.

Other uses of the insulation panel of this invention include the insulation of industrial equipment, as will be appreciated by those skilled in the art.

It is predicted that the insulation panel according to the invention having a vacuum of approximately $10^{-2}$ Torr will have an R-value of approximately 15 to 50 R's per inch. This assumes a 12 pound density board with 10 percent by weight of amorphous silica powder. A commercially available powder is FK 500 LS brand precipitated silica provided by North American Silica Company, Richfield Park, N.J. Precipitated silica and fumed silica are also sold by Cabot Corporation.

Referring to FIG. 4 it can be seen that the glass fibers are created by the action of fiberizers 28. The fiberizers can be any means suitable for making glass fibers, such as rotary fiberizers, which are well known in the art. The glass fibers can be transported downwardly in a collecting chamber and collected on collecting conveyor 30.

Preferably the silica powder is applied to the fibers as they are traveling downwardly from the fiberizers to the collecting conveyor. For such a purpose, nozzles 32 are positioned to spray the particulate material into the downwardly moving stream of fibers. Due to the fineness of the particulate material, it is preferable to suspend the material in a solution, preferably an aqueous solution and to spray the solution into the downwardly moving stream of fibers. The fibers are travelling through a relatively turbulent and hot environment, and most, if not all, of the liquid in the aqueous solution evaporates by the time the fibers reach the collecting conveyor.

The fibers are collected in the form of a blanket or pack 34. The pack is then passed through pressing station 36 where upper conveyor 38 and lower conveyor 40 press the pack to the desired density. Preferably heat is applied during the pressing process and it is preferable that the temperature of the board be raised to at least 600° F., and most preferably at least 1,000° F.

After the board leaves the pressing station it is chopped by chopper 42 into insulation panels. A vacuum baking operation is done on the panels to clean them prior to encapsulation. The cleaning step is necessary to reduce outgassing and subsequent loss of vacuum. Thereafter, the insulation panels are encapsulated with an envelope, and evacuated according to procedures known in the art.

The preferred method for measuring the amount of silica powder in a coreboard containing glass fibers and silica powder is to measure the actual percentage of silicon atoms in the board using mass spectroscopy. Since the glass composition is known, the amount of additional silicon can be calculated, thereby resulting in a determination of the exact percentage of the silica powder in the board. Similar measurements could be taken with powders of other materials and with mineral fibers other than glass fibers.

Various modifications may be made in the structure and method shown and described without departing from the spirit and scope of the invention.

INDUSTRIAL APPLICABILITY

This invention will be found to be useful as insulation for appliances, transportation vehicles, and industrial equipment.

I claim:

1. An insulation panel comprising a predominant amount of mineral fibers in the form of a mineral fiber board having a density of between 8 and 28 pounds per cubic foot, the fibers having no organic binder thereon, and particulate material packed in the interstices of the board, the fibers having a diameter between 1 and 25 microns, the particulate material being between 5 and 40 percent by weight of the combined mineral fibers and particulate material, and the particulate material having a surface area of at least 50 square meters per gram.

2. The insulation panel of claim 1 further comprising a gas-tight envelope encapsulating the board, the envelope being partially evacuated.

3. The insulation panel of claim 2 in which the envelope contains gases having a molecular weight greater than that of gaseous oxygen, where said gases constitute at least 50 percent of the gas molecules contained in the envelope.

4. The insulation panel of claim 2 in which the particulate material is an amorphous silica powder.

5. The insulation panel of claim 4 in which the gas-tight envelope comprises metal foil having a thickness between ½ mil and 4 mils.

6. The insulation panel of claim 5 in which the fibers are glass fibers.

7. The insulation panel of claim 6 in which a gettering material is positioned within the gas-tight envelope.

8. The insulation panel of claim 6 in which the vacuum is between $10^{-4}$ Torr and 10 Torr.

9. An insulation panel comprising a predominant amount of mineral fibers in the form of a mineral fiber board having a density of between 8 and 28 pounds per cubic foot, the fibers having no organic binder thereon, and amorphous silica powder packed in the interstices of the board, the fibers having a diameter between 1 and 25 microns, the particulate material being between 5 and 40 percent by weight of the combined mineral fibers and particulate material, and the amorphous silica having a surface area of at least 150 square meters per gram, and a gas-tight envelope encapsulating the board, the envelope being evacuated to a vacuum between $10^{-4}$ Torr and 10 Torr.

10. The insulation panel of claim 9 in which the mineral fibers are glass fibers.

11. The insulation panel of claim 9 positioned within the walls of a refrigerator or freezer.

12. An insulation panel comprising a predominant amount of mineral fibers in the form of a mineral fiber board, the fibers having no organic binder thereon, and particulate material packed in the interstices of the board, the fibers having a diameter between 1 and 25 microns, the particulate material being between 5 and 40 percent by weight of the combined mineral fibers and particulate material, and the particulate material having a surface area of at least 50 square meters per gram, where the density of mineral fibers within the panel is sufficient to block a substantial portion of the radiation heat transfer, and the particulate material is sufficient to block a substantial portion of the heat transfer by gas conduction.

13. The insulation panel of claim 12 in which the mineral fiber board has a density of between 8 and 28 pounds pcf.

14. The insulation panel of claim 13 further comprising a gas-tight envelope encapsulating the board, the envelope being evacuated to a vacuum between $10^{-4}$ Torr and 10 Torr.

15. The insulation panel of claim 14 in which the envelope contains gases having a molecular weight greater than that of gaseous oxygen, where said gases constitute at least 50 percent of the gas molecules contained in the envelope.

16. The insulation panel of claim 14 in which the gas-tight envelope comprises metal foil having a thickness between ½ mil and 4 mils.

17. The insulation panel of claim 16 in which a gettering material is positioned within the gas-tight envelope.

18. The insulation panel of claim 16 in which the vacuum is between $10^{-4}$ Torr and 10 Torr.

19. The insulation panel of claim 13 in which the particulate material is an amorphous silica powder.

20. The insulation panel of claim 19 in which the mineral fibers are glass fibers.

* * * * *